US007733846B2

(12) United States Patent
Liu

(10) Patent No.: US 7,733,846 B2
(45) Date of Patent: Jun. 8, 2010

(54) METHOD AND CONTROL CHANNEL FOR UPLINK SIGNALING IN A COMMUNICATION SYSTEM

(75) Inventor: Jung-Tao Liu, Madison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1466 days.

(21) Appl. No.: 10/647,339

(22) Filed: Aug. 26, 2003

(65) Prior Publication Data
US 2005/0047393 A1 Mar. 3, 2005

(51) Int. Cl.
H04L 12/66 (2006.01)
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl. ............... 370/352; 370/235; 370/264

(58) Field of Classification Search ............ 370/352, 370/386, 335, 337, 329, 349, 235, 314, 445, 370/345, 443, 437, 264, 354, 473; 455/562.1, 455/426.1, 522, 502, 442
See application file for complete search history.

(56) References Cited

U.S. PATENT DOCUMENTS

| 5,239,674 | A | * | 8/1993 | Comroe et al. | ............ 455/426.1 |
|---|---|---|---|---|---|
| 5,721,732 | A | * | 2/1998 | Emeott et al. | ............... 370/437 |
| 6,236,646 | B1 | * | 5/2001 | Beming et al. | ............... 370/335 |
| 6,285,886 | B1 | * | 9/2001 | Kamel et al. | ................ 455/522 |
| 6,359,865 | B1 | * | 3/2002 | Toskala et al. | .............. 370/329 |
| 6,501,745 | B1 | * | 12/2002 | Turina et al. | ................ 370/337 |
| 6,771,987 | B1 | * | 8/2004 | Dam et al. | ............... 455/562.1 |
| 6,888,805 | B2 | * | 5/2005 | Bender et al. | ............... 370/314 |
| 7,092,373 | B2 | * | 8/2006 | Parantainen et al. | ........ 370/337 |
| 2002/0080719 | A1 | * | 6/2002 | Parkvall et al. | ............. 370/235 |
| 2002/0093953 | A1 | * | 7/2002 | Naim et al. | ................. 370/386 |
| 2002/0172217 | A1 | * | 11/2002 | Kadaba et al. | ............. 370/443 |
| 2002/0181436 | A1 | * | 12/2002 | Mueckenheim et al. | ..... 370/349 |
| 2003/0043839 | A1 | * | 3/2003 | Luschi et al. | ............... 370/445 |
| 2004/0109433 | A1 | * | 6/2004 | Khan | ......................... 370/345 |
| 2004/0219919 | A1 | * | 11/2004 | Whinnett et al. | ........... 455/442 |
| 2005/0043045 | A1 | * | 2/2005 | Cheng et al. | ................ 455/502 |
| 2005/0157678 | A1 | * | 7/2005 | Mantha et al. | .............. 370/329 |

OTHER PUBLICATIONS

3GPP TS 25.211 V5.3.0(Dec. 2002), 3$^{rd}$ Generation Partnership Project; Technical Specification group Radio Acc3ss Network Physical channel and mapping of transport channels onto physical channels(FDD) (release 5).

* cited by examiner

*Primary Examiner*—Thjuan K Addy
(74) *Attorney, Agent, or Firm*—Harness, Dickey & Pierce

(57) ABSTRACT

In a method of transmitting control signals for uplink transmission of packet data in a communication network, control signal data related to scheduling a user for uplink transmission of packet data is transmitted over a single control channel. The single control channel may be configured based on the transmission mode the user is in for scheduling an uplink transmission from the user to the network, so that only one control channel is used, regardless of the transmission mode the user is in for scheduling the user for the uplink transmission. The control channel may be embodied as a sub-frame adapted to carry control information that is dependent based on the transmission mode the user is in for scheduling an uplink transmission from the user to the network.

14 Claims, 7 Drawing Sheets

METHOD AND CONTROL CHANNEL FOR UPLINK SIGNALING IN A COMMUNICATION SYSTEM

BACKGROUND OF THE INVENTION

1. Field of the Invention

The present invention relates to control signaling in the uplink and a control channel for carrying control signal data in the uplink of a communication system.

2. Description of Related Art

Expanded efforts are underway to support the evolution of the Universal Mobile Telecommunications System (UMTS) standard, which describes a network infrastructure implementing a next generation Wideband Code Division Multiple Access (W-CDMA) air interface technology. A UMTS typically includes a radio access network, referred to as a UMTS terrestrial radio access network (UTRAN). The UTRAN may interface with a variety of separate core networks (CN). The core networks in turn may communicate with other external networks (ISDN/PSDN, etc.) to pass information to and from a plurality of wireless users, or user equipments (UEs), that are served by radio network controllers (RNCs) and base transceiver stations (BTSs, also referred to as Node Bs), within the UTRAN, for example.

Standardizing bodies such as the 3rd Generation Partnership Project (3GPP and 3GPP2), a body which drafts technical specifications for the UMTS standard and other cellular technologies, have introduced several advanced technologies in an effort to ensure that any associated control information is carried in an efficient manner. Certain advanced or enabling technologies may include fast scheduling, Adaptive Modulation and Coding (AMC) and Hybrid Automatic Repeat Request (HARQ) technologies. These technologies have been introduced in an effort to improve overall system capacity. In general, a scheduler or scheduling function at a Node B (base station) selects a UE (mobile station) for transmission at a given time, and adaptive modulation and coding allows selection of the appropriate transport format (modulation and coding) for the current channel conditions seen by the UE.

AMC technologies enable a selection of a data rate and a transmission format (i.e., modulation level and channel coding rate) that best "suits" the scheduled user's prevailing channel conditions. Delays and measurement errors result in degraded performance from AMC.

HARQ allows combining of the original transmission with the new transmission, rather than to discard the original transmission. This may greatly improve the probability of correct decoding of the packet. The word "hybrid" in HARQ indicates that Forward Error Correction (FEC) techniques have been used in addition to ARQ techniques. Accordingly, HARQ helps to ensure that transmissions resulting in unsuccessful decoding, by themselves, are not wasted.

While much of the standardization to date has focused on the downlink (forward link from Node B/base station to UE/mobile station), similar enhancements are now being considered for the uplink (reverse link). Further evolution of 3G standards include enhanced uplink (EU) features to support high-speed reverse link packet access (uplink from mobile station to base station). Many of the techniques used in the forward link (i.e., fast scheduling, AMC, HARQ, etc.) may also be usable on the reverse link, so as to improve data rates and system capacity, for example.

In voice-based or circuit-based communication systems, control signaling or scheduling is typically not employed. Once the communication link is established between network and user, the user may transmit continuously, essentially at will, at a fixed data rate. Rate change occurs rarely, if ever, during the duration of the call/connection. The rate change is done by using higher layer signaling between the RNC and the UE. The signaling is carried over the existing communication link and the change is extremely slow and infrequent.

However, packet data-based communication systems require coordination between network and user at a much faster pace, as the packet data is typically transmitted in bursts. Thus, data rates and transmit times may typically be subject to some type of scheduling, since rate, duration and time of user transmission in the uplink may be limited or constrained by the network. Conventionally, this 'fast coordination' has been done only in the downlink, i.e., a Node B transmitting signaling and/or control information over a physical channel known as a high-speed shared control channel (HS-SCCH) in the downlink to users the Node B is serving. However, in order to support some of the above enhancements, and to facilitate the above-noted coordination with the network, control signaling may need to be evaluated for the uplink, for purposes of scheduling a user for uplink transmission and coordination with the network.

SUMMARY OF THE INVENTION

Exemplary embodiments of the present invention are directed to a method for transmitting control signal data in the uplink for scheduling an uplink transmission of packet data from a user, and a control channel for carrying the control signal data in the uplink. In the method, control signal data related to scheduling a user for uplink transmission of packet data is transmitted over the single control channel. The single control channel may be configured based on the transmission mode the user is in for scheduling an uplink transmission from the user to the network, so that only one control channel is used, regardless of the transmission mode the user is in for scheduling the user for the uplink transmission. The control channel may be embodied as a sub-frame adapted to carry the control information. The control information contained in the sub-frame is dependent on the transmission mode the user is in for scheduling the uplink transmission from the user to the network.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus do not limit the exemplary embodiments of the present invention and wherein.

DETAILED DESCRIPTION OF EXEMPLARY EMBODIMENTS

Although the following description of the present invention is based on the Universal Mobile Telecommunications System (UMTS) network infrastructure implementing a next generation Wideband Code Division Multiple Access (W-CDMA) air interface technology, it should be noted that the exemplary embodiments shown and described herein are meant to be illustrative only and not limiting in any way. As such, various modifications will be apparent to those skilled in the art. For example, it will be understood that the present invention finds application to any medium access control protocol with multiple modes in other spread spectrum systems such as CDMA2000 systems.

Where used below, base transceiver station (BTS) and Node-B are synonymous and may describe equipment that provides data connectivity between a packet switched data network (PSDN) such as the Internet, and one or more mobile stations. Additionally where used below, the terms user, user equipment (UE), subscriber, mobile station and remote station are synonymous and describe a remote user of wireless resources in a wireless communication network.

In general, the exemplary embodiments of the present invention are directed to a method for transmitting control signal data in the uplink and a control channel for carrying control signal data in the uplink of a wireless communication system. The exemplary embodiments introduce an uplink control channel for carrying control signal data in the uplink from a user. The control channel may hereafter be referred to as an Enhanced Uplink Dedicated Physical Control Channel (EU-DPCCH). The EU-DPCCH is envisioned for enhanced uplink (EU) features to support high-speed reverse link packet access in UMTS, although the exemplary embodiments are not limited for application to high-speed reverse link packet access in UMTS.

The EU-DPCCH is a physical channel. The EU-DPCCH may be physically embodied by a sub-frame structure, each sub-frame including a plurality of slots, each slot including one of more fields. There is only one EU-DPCCH for a user, and the same EU-DPCCH may be used, whether the user is in a rate-controlled transmission mode (for purposes of scheduling or coordination with the network) and transmitting autonomously, or a scheduled transmission mode in which the user transmits based on a scheduling command from the network. If the user is not configured in either mode (neither autonomously transmitted nor transmitting based on scheduling command), the user may transmit the EU-DPCCH to report status to the network. In this case, the user may be referred to as in a reporting mode. However, initially an exemplary wireless communication network architecture is described, as are general functions of dedicated uplink physical channels, to place the exemplary embodiments in context.

Figure 1:
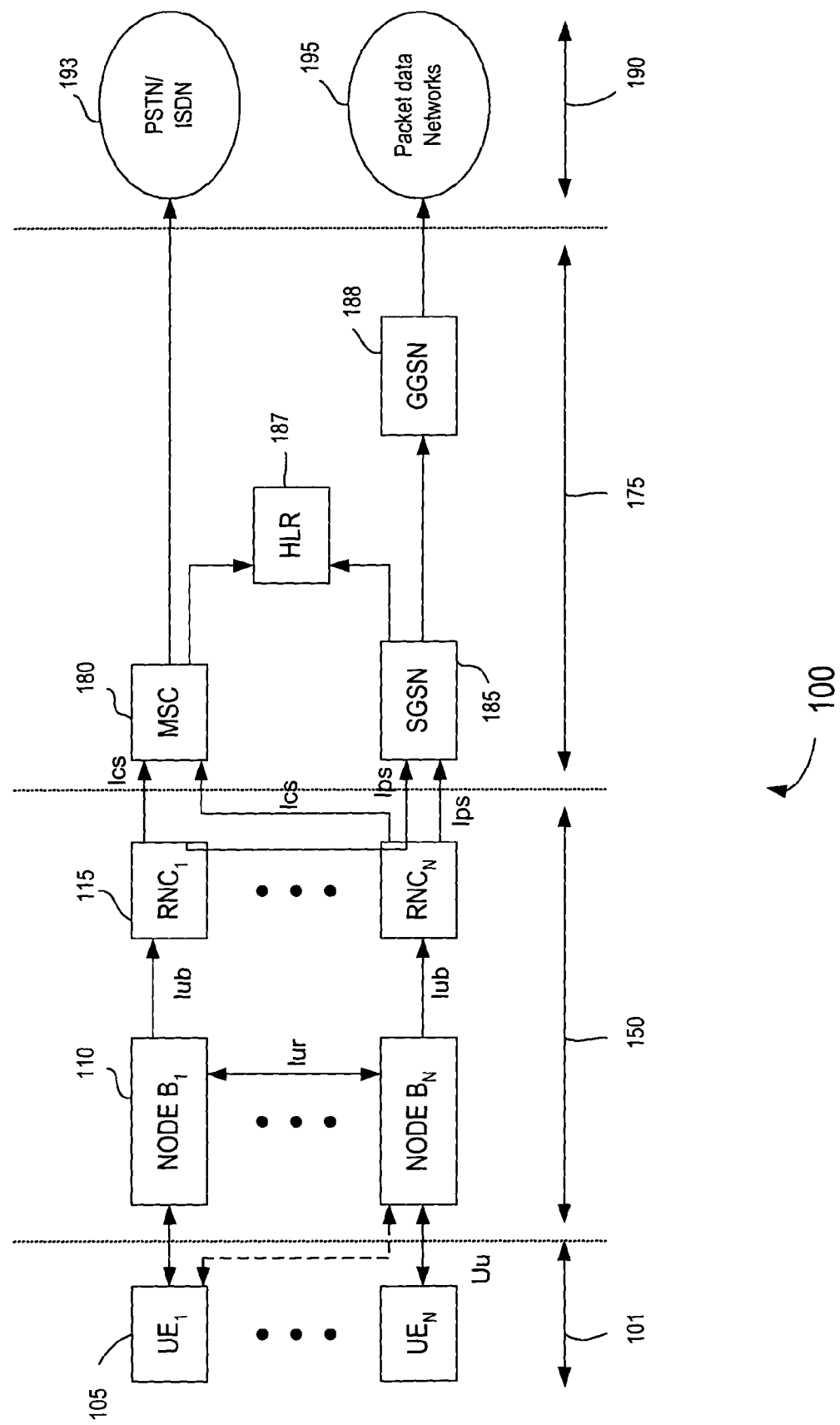
FIG. 1 illustrates a high-level diagram of the UMTS architecture, in accordance with an exemplary embodiment of the invention.

FIG. 1 illustrates a high-level diagram of the UMTS architecture, in accordance with an exemplary embodiment of the invention. This UMTS architecture is provided merely as an exemplary network or system architecture, it being understood that the EU-PDCCH could be applicable to other spread spectrum systems such as CDMA2000 systems.

Referring to FIG. 1, a UMTS architecture 100 comprises a radio access network part that may be referred to as a UMTS terrestrial radio access network (UTRAN) 150. The UTRAN 150 interfaces over a Uu air interface with a radio interface part 101; namely user equipments (UEs) such as mobile stations. The Uu air interface is the radio interface between the UTRAN 150 and one or more UEs 105. The UTRAN 150 also interfaces with one or more core networks (CNs) 175 (only one being shown in FIG. 1 for simplicity) via interfaces Ics and Ips, for example. Ics, short for Interface Unit (Circuit Switched) interface, is the interface in UMTS which links the RNC with a Mobile Switching Center (MSC). Ips, short for Interface Unit (Packet Switched) interface, is the interface in UMTS which links the RNC with a Serving GPRS Support Node (SGSN). The Uu air interface enables interconnection of Node Bs with UEs, for example.

CN 175 may include mobile switching centers (MSCs) 180, SGSNs 185 and Gateway GPRS serving/support nodes (GGSNs) 188. SGSN 185 and GGSN 188 are gateways to external networks 190. In general in UMTS, SGSNs and GGSNs exchange packets with mobile stations over the UTRAN, and also exchange packets with other internet protocol (IP) networks, referred to herein as "packet data networks". External networks 190 may include various circuit networks 193 such as a packet Switched Telephone Network (PSTN) or Integrated Service Digital Network (ISDN) and packet data networks 195. UTRAN 150 may also be linked to the CN 175 via back-haul facilities (not shown) such as T1/E1, STM-x, etc., for example.

The UTRAN 150 may include cell sites, called Node Bs 110, which may serve a group of UEs 105, generally using a Uu interface protocol. A Node B 110 may contain radio transceivers that communicate using Iub protocol with radio network controllers (RNCs) 115 in UTRAN 150. RNCs 115 within UTRAN 150 may communicate with each other using an Iur protocol, for example. The Iur air interface is a subset of the Iu interface that enables interconnection of RNCs with each other. Several Node Bs 110 may interface with a single RNC 115 where, in additional to call setup and control activity, tasks such as radio resource management and frame selection in soft handoff may be carried out. Node Bs 110 and RNCs 115 may be connected via links that use ATM-based packet transport, for example.

The EU-DPPCH is a physical channel. In general, physical channels are defined by a specific carrier frequency, scrambling code, channelization code (optional), time start and stop (giving a duration) and, on the uplink, relative phase (0 or $\pi/2$). Time durations are defined by start and stop instants, measured in integer multiples of chips. Suitable multiples of chips include a radio frame, a slot (known also as a timeslot) and a sub-frame. A radio frame is a processing duration which consists of 15 slots. The length of a radio frame corresponds to 38400 chips. A slot is a duration which consists of fields containing bits. The length of a slot corresponds to 2560 chips. In general, a sub-frame is a basic time interval for a High Speed Downlink Shared Channel (HS-DSCH) transmission and HS-DSCH-related signaling at the physical layer (Layer 1). The HS-DSCH is a downlink transport channel shared by several UEs. The length of a sub-frame typically corresponds to 3 slots (7680 chips).

Figure 2A:
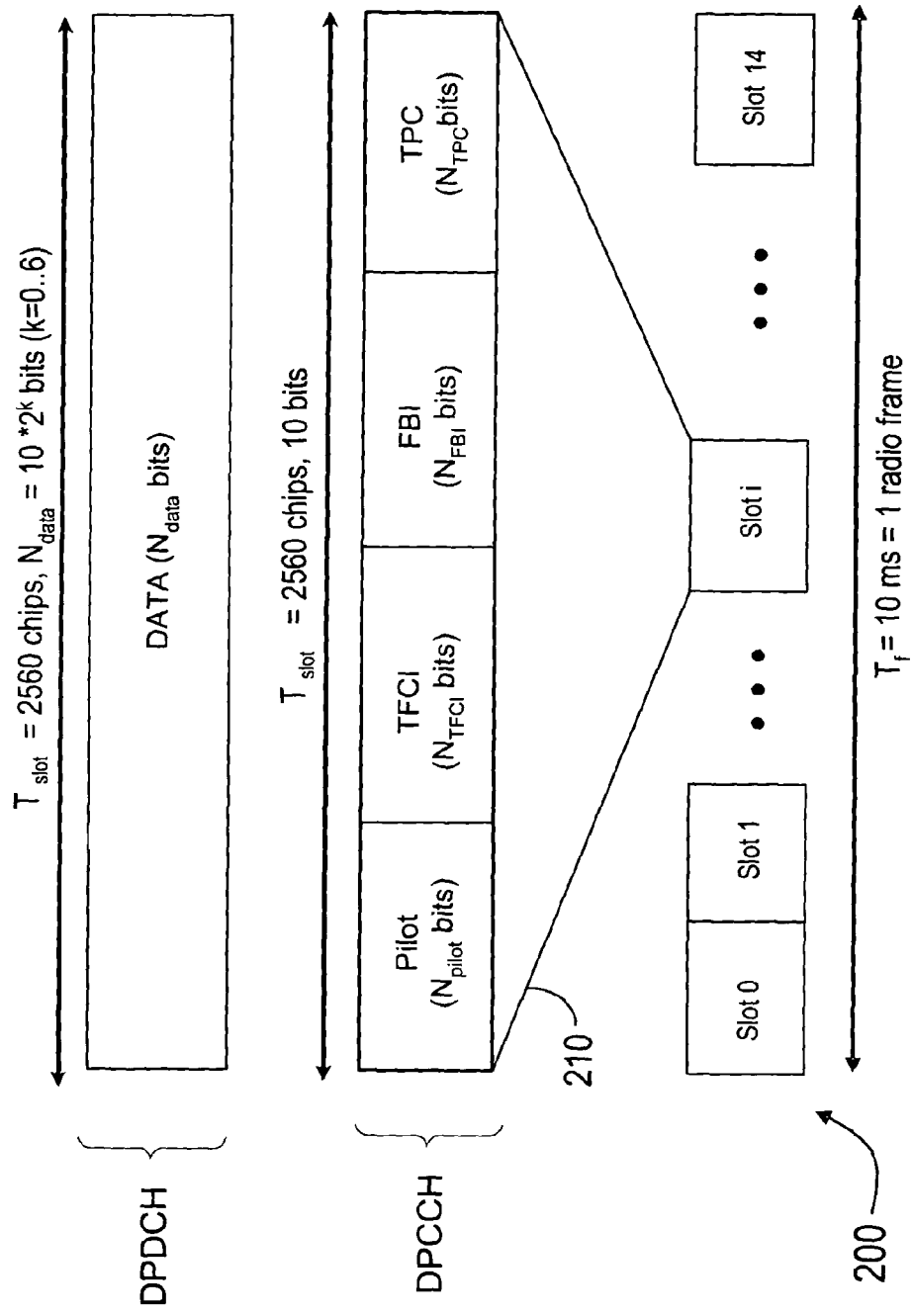
FIG. 2A illustrates the frame structure of a conventional uplink DPDCH and uplink DPCCH.

FIG. 2A illustrates the frame structure of a conventional uplink DPDCH and uplink DPCCH. This frame structure is described in detail in 3GPP TS 25.211 V5.3.0, entitled "3rd Generation Partnership Project; Technical Specification and Group Radio Access Network; physical channels and mapping of transport channels onto physical channels (FDD) (Release 5)", December 2002. Although this document has not been implemented in the standard, the frame structure provides a context for the discussion of dedicated physical channels.

Conventionally in UMTS, there are three types of uplink dedicated physical channels, the uplink Dedicated Physical Data Channel (uplink DPDCH), the uplink Dedicated Physical Control Channel (uplink DPCCH), and the uplink Dedicated Control Channel associated with HS-DSCH transmission (uplink HS-DPCCH). The DPDCH, the DPCCH and the HS-DPCCH are I/Q code multiplexed. The uplink DPDCH is used to carry the DCH transport channel (a transport channel of services offered by Layer 1 (physical layer) to the higher layers (OSI Layers 3-7). There may be zero, one, or several uplink DPDCHs on each radio link. As described in 3GPP TS 25.211 V5.3.0, transport channels are capable of being mapped to physical channels. Within the physical layer itself the exact mapping is from a composite coded transport channel (CCTrCH) to the data part of a physical channel. In other words, DCHs are coded and multiplexed and the resulting stream is mapped sequentially (first-in-first-mapped) via the CCtrCH directly to the physical channels (e.g., DPDCH, DPCCH)

The conventional uplink DPCCH is used to carry control information generated at Layer 1. The Layer 1 control information consists of known pilot bits to support channel estimation for coherent detection, transmit power-control (TPC) commands, feedback information (FBI), and an optional transport-format combination indicator (TFCI). The TFCI informs the receiver about the instantaneous transport format combination of the transport channels mapped to the simultaneously transmitted uplink DPDCH radio frame.

Referring now to FIG. 2A, Each radio frame 100 of length (Transmission Time Interval (TTI)) 10 ms is split into fifteen (15) slots 110, each of length $T_{slot}$=2560 chips, corresponding to one power-control period. There is one DPCCH on each radio link. The DPDCH and DPCCH are frame aligned with each other.

The parameter k in FIG. 2A determines the number of bits per uplink DPDCH slot, and is related to the spreading factor SF of the DPDCH as SF=256/$2^k$. The DPDCH spreading factor may range from 256 down to 4. The spreading factor of the uplink DPCCH is equal to 256, i.e. there are 10 bits per uplink DPCCH slot. The exact number of bits of the uplink DPDCH and the different uplink DPCCH fields ($N_{pilot}$, $N_{TFCI}$, $N_{FBI}$, and $N_{TPC}$) is specified in section 5.2 of 3GPP TS 25.211 V5.3.0. What slot format to use is configured by higher layers and can also be reconfigured by higher layers. Multi-code operation is possible for the uplink dedicated physical channels. When multi-code transmission is used, several parallel DPDCHs are transmitted using different channelization codes. However, there is only one DPCCH per radio link.

Figure 2B:
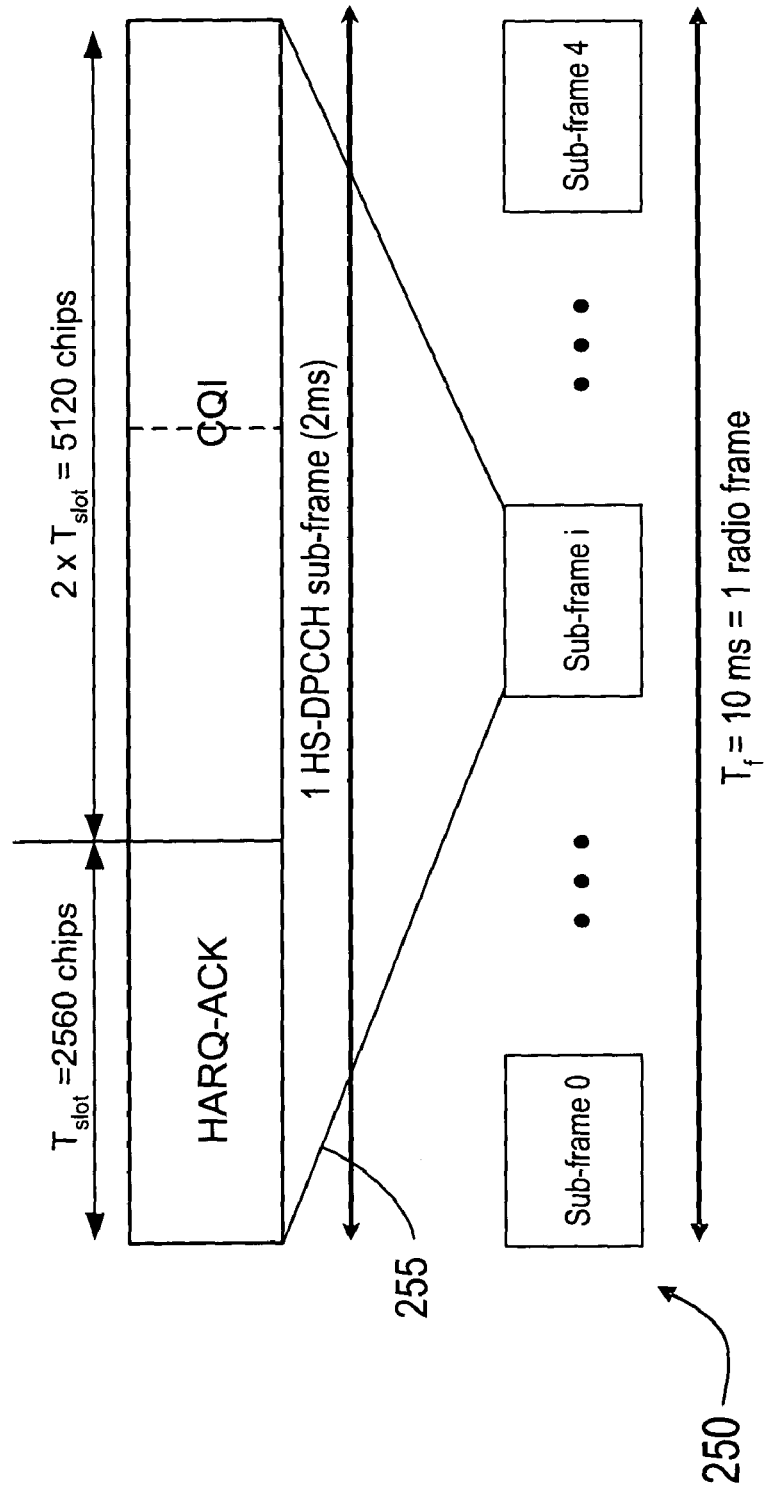
FIG. 2B illustrates the frame structure of a conventional uplink HS-DPCCH.

FIG. 2B illustrates the frame structure of a conventional HS-DPCCH. The HS-DPCCH carries uplink feedback signaling related to downlink HS-DSCH transmission. The HS-DSCH-related feedback signaling consists of Hybrid-ARQ Acknowledgement (HARQ-ACK) and Channel-Quality Indication (CQI). Each sub-frame 250 of length 2 ms (3*2560 chips) consists of three slots 255, each of length 2560 chips. The HARQ-ACK is carried in the first slot 255 of the HS-DPCCH sub-frame. The CQI is carried in the second and third slots 255 of sub-frame 250. There is at most one HS-DPCCH on each radio link. The HS-DPCCH may only exist together with an uplink DPCCH.

The conventional uplink DPCCH does not provide signaling for multiple transmission modes, and does not provide any information to support HARQ and adaptive modulation and coding (AMC). Furthermore, the TFCI is used only for the DPDCH and has a transmission time interval (TTI) of 10 ms.

Figure 3:
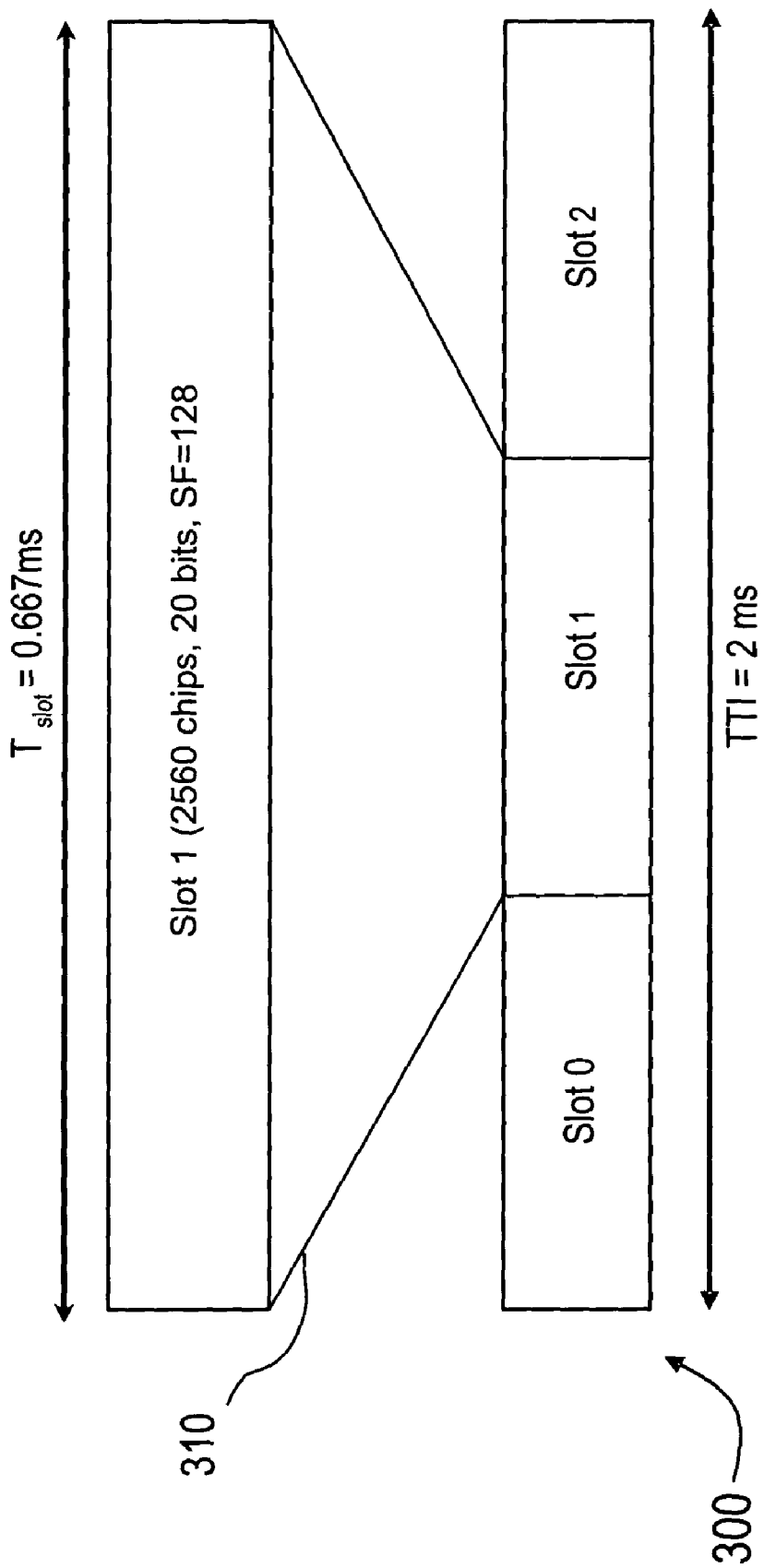
FIG. 3 illustrates an exemplary general structure of an EU-DPCCH sub-frame in accordance with the exemplary embodiments of the invention.

FIG. 3 illustrates an exemplary general structure of an EU-DPCCH sub-frame in accordance with the exemplary embodiments of the invention. The EU-PDCCH is designed to support Enhanced Uplink (EU) features in UMTS and is associated with the uplink data channel, DPDCH, to carry necessary control information on the uplink. Unlike the conventional uplink DPCCH, the EU-DPCCH may be used to send control signaling information for packet data (such as high speed data) on the uplink when a UE is configured in both a scheduled transmission mode and a rate-controlled transmission mode. These modes are described in further detail hereafter.

Referring to FIG. 3, a sub-frame 300 of an EU-DPCCH is illustrated; the sub-frame 300 is shown having a fixed transmission time interval (TTI) of 2 ms, it being understood that 2 ms is an exemplary TTI. Other fixed TTI lengths may be applicable, such as 3.3 ms, 4 ms, 6 ms and 8 ms, or a variable TTI length, depending on the desired implementation. Accordingly, the TTI length may be adapted for a desired control channel design.

Each sub-frame 300 comprises three slots 310 (Slot 0, Slot 1 and Slot 2), each of a duration ($T_{slot}$) 0.667 ms each ($T_{slot}$=2560 chips=0.667 ms, 2*10*k bits (k=256/SF)). Although not shown, control signal data in each slot 210 may be transmitted over multiple channelization code slots. The EU-DPCCH uses a channelization code of spreading factor (SF) 128. With BPSK modulation, the 2 ms TTI and fixed SF=128, up to 60 coded bits may be transmitted per sub-frame 300. Each slot 310 may include a specified field format, depending on what transmissions mode the UE 105 is in for scheduling transmission of packet data and/or high speed data in the uplink to the Node B 110. Regardless of the TTI chosen, the number of fields that are specified in a particular slot 310 of the sub-frame 300 may remain constant.

Scheduled and Rate-Controlled Transmission Modes, Reporting Mode

The EU-DPCCH is designed so it can support a UE 105 in at least two different types of transmission modes for purposes of scheduling, or coordination with the network (e.g., to coordinate with a serving Node-B 110). The two transmission modes of operation proposed for scheduling in the uplink direction include: (a) a scheduled transmission mode; and (b) a rate-controlled mode, known as a 'Node B rate-controlled mode' or as an autonomous transmission mode from the point of view of the UE 105. When neither mode is implemented, such as the case where the EU-DPCCH is not associated with any EU-DPDCH, a UE 105 may transmit status data to the Node B for scheduling over the EU-DPCCH in what may be referred to as a 'reporting mode'.

In other words, if there is no companion EU-DPDCH on the uplink, a UE 105 is in reporting mode. If there is no associated downlink transmission grant message from the Node B 110 that is serving the UE 105, the UE 105 is in rate-controlled transmission mode. If there is an associated downlink transmission grant message from the serving Node B 110, the UE 105 is in the scheduling transmission mode. Each mode has a specific EU-PDCCH sub-frame format, as will be described in further detail hereafter.

In a scheduled mode of operation, the Node B 110 determines which UEs 105 transmit on the uplink, start times for the UEs 105 and duration of transmissions. The Node B 110 would typically do this based on some knowledge of the UE 105's buffer status (amount of data waiting) and available transmit power. Additionally, a scheduler at the Node B 110 would estimate the channel for each UE 105 and the amount of "headroom" or margin available to the RoT threshold, in determining which UEs 105 can transmit and at what rate (or equivalently at what transmit power). Rise Over Thermal (or RoT) represents a total received transmit power normalized by the thermal noise and is a constraint on the uplink, thus RoT should be below a certain threshold. Scheduling and/or rate selection algorithms should work within this constraint.

In the rate-controlled mode, the Node B 110 does not explicitly determine which UEs 105 transmit on the uplink, start times and durations. In the rate-controlled mode, the Node B 110 would typically specify an allowed data rate (such as maximum allowable transmit rate), either per UE 105 or for all UEs 105, for example, based on dynamic RoT variations. The UEs 105 can then transmit autonomously, but are subject to guidelines or rules such as the allowed rates specified by the Node B 110.

The scheduled mode may allow for reduced latencies in rate control, exploitation of fast channel quality variations, more precise control of the RoT and consequently, much better efficiency for a given constraint on the RoT. For example, if one desired to ensure that RoT did not exceed a threshold, X, more than 1% of the time, then, for that constraint, the achievable throughput with the scheduled mode will likely be higher than with autonomous mode. Furthermore, the scheduled mode may be able to precisely control how many users transmit in a given time interval. In the uplink of UMTS or CDMA systems, simultaneous transmissions interfere with each other; the scheduled mode may ensure that only one user transmits at a time. This may significantly enhance throughput.

The scheduled mode has some disadvantages. Scheduling UEs 105 in soft handoff (SHO) without any coordination between Node B 110s in the active set (i.e. Node B's 110 that will decode its data) could lead to RoT violations that may significantly impact other power controlled channels. For example, consider a UE 105 in soft handoff with two Node B 110s (#1 and #2). The UE 105 may be scheduled by Node B 110 #1 to transmit at rate R1. Without any coordination, Node B 110 #1 may only be using its "headroom" or margin to the RoT constraint to determine R1. Node B 110 #2 may schedule some other user in its cell, completely unaware that UE 105 will transmit at rate R1 and cause additional and unpredictable interference to the user.

Additionally, fast coordination (i.e. exchange of information between Node B 110s in the active set to ascertain which UE 105 each Node B 110 is scheduling and at what rate) is not considered feasible with the current architecture. This is because the only way the Node B 110s can communicate with each other is through the RNC 115 of the UTRAN 150. The delay associated with this process is much longer than the typical scheduling intervals, the former being of the order of 100 ms, while the latter being of the order of 10 ms or lower. Thus, uncoordinated scheduling of UEs 105 in SHO can result in RoT threshold violations, or alternatively, Node Bs 110 will have to be very conservative in their usage of the available "headroom". The former approach can cause degradation in performance for voice users, while the latter would result in inefficient use of uplink capacity.

Furthermore, if the UE 105 simply follows the scheduling command of either Node B 110, then the active set Node Bs 110 for the UE 105 that does not schedule the user will not attempt to decode its data. Therefore, the UE 105 transmission in the uplink will not derive the benefit of selection diversity (also known as macrodiversity). Some of these problems may be alleviated if the Node Bs 110 are made aware of the SHO state of each UE 105, so as to factor this into Node B 110 scheduling decisions.

Advantages of the rate-controlled mode of transmission may be at least two-fold. Firstly, when only a small amount of data needs to be sent (e.g. TCPs, ACKs or HTTP requests, for example) the latency and signaling overhead associated with the scheduled mode may be excessive. Secondly, in SHO, all Node Bs 110 are aware that the UE 105 can transmit at any time and therefore will attempt to decode the data. Therefore the UE 105 can derive the benefit of selection diversity. In selection diversity, each Node B 110 will decode the user's data and send it to the RNC 115. The RNC 115 will "select" the replica that passed a cyclic redundancy code (CRC) error check or equivalent frame quality test. Thus, the UE 105's uplink transmission may derive the benefit of diversity.

One drawback of the autonomous mode is that in simplex (non-soft handoff) mode with sufficient backlogged data, the achievable throughputs may be limited. This is because the Node B does not precisely control the transmission times of the UEs and, therefore, inherently, must follow a more conservative approach in assignment of allowable data rates to UEs. For example, in the selection of allowable rate assignments for users over the duration of the next t seconds, the Node B has to factor in the RoT constraint when a large number of UEs transmit. Regardless of the transmission mode the UE 105 is in, the same EU-DPCCH may be used, albeit with different field formats.

Figure 4A:
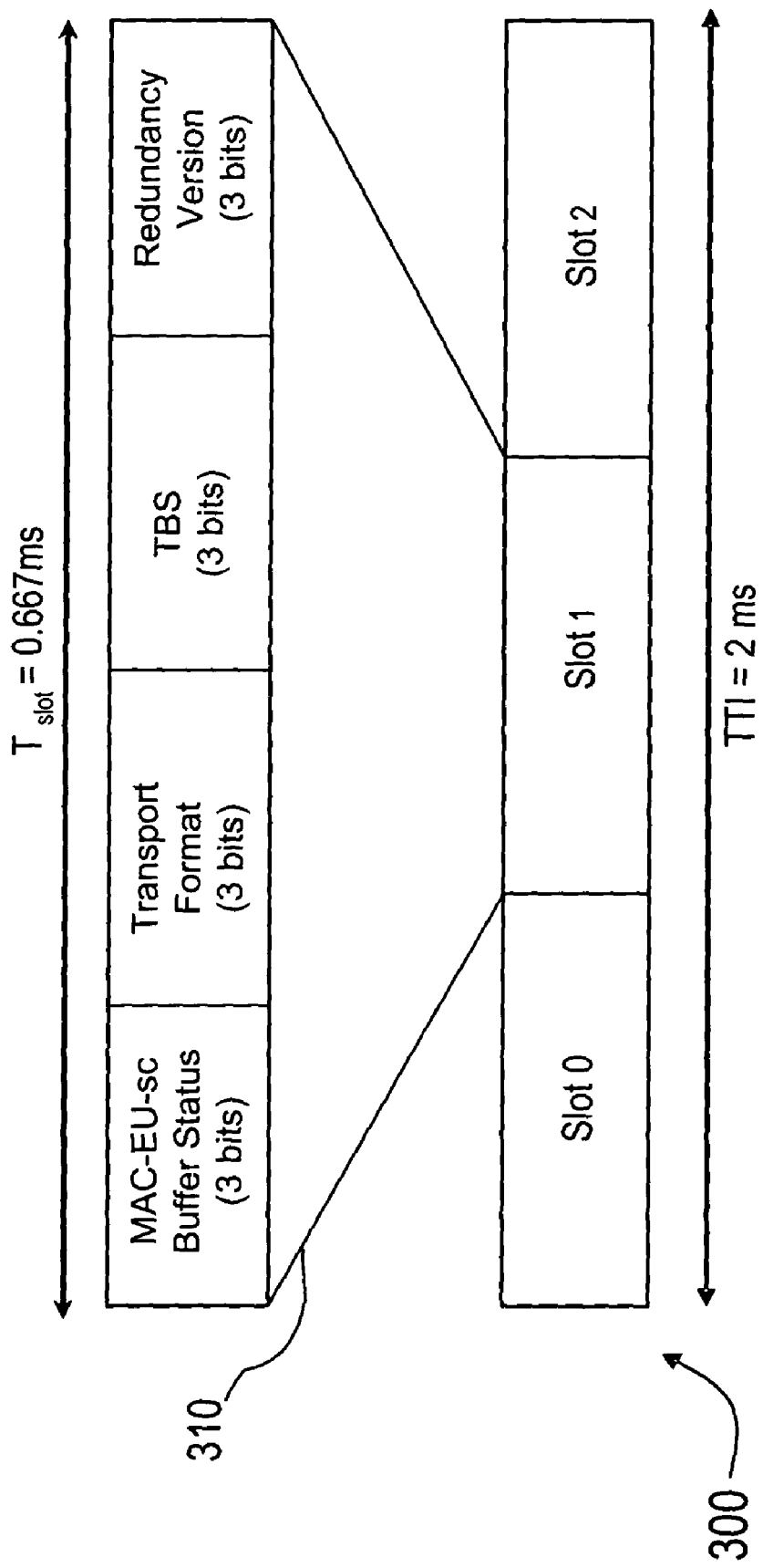
FIGS. 4A-4C illustrate exemplary structures of an EU-DPCCH sub-frame configured for a UE operating in different
Figure 4B:
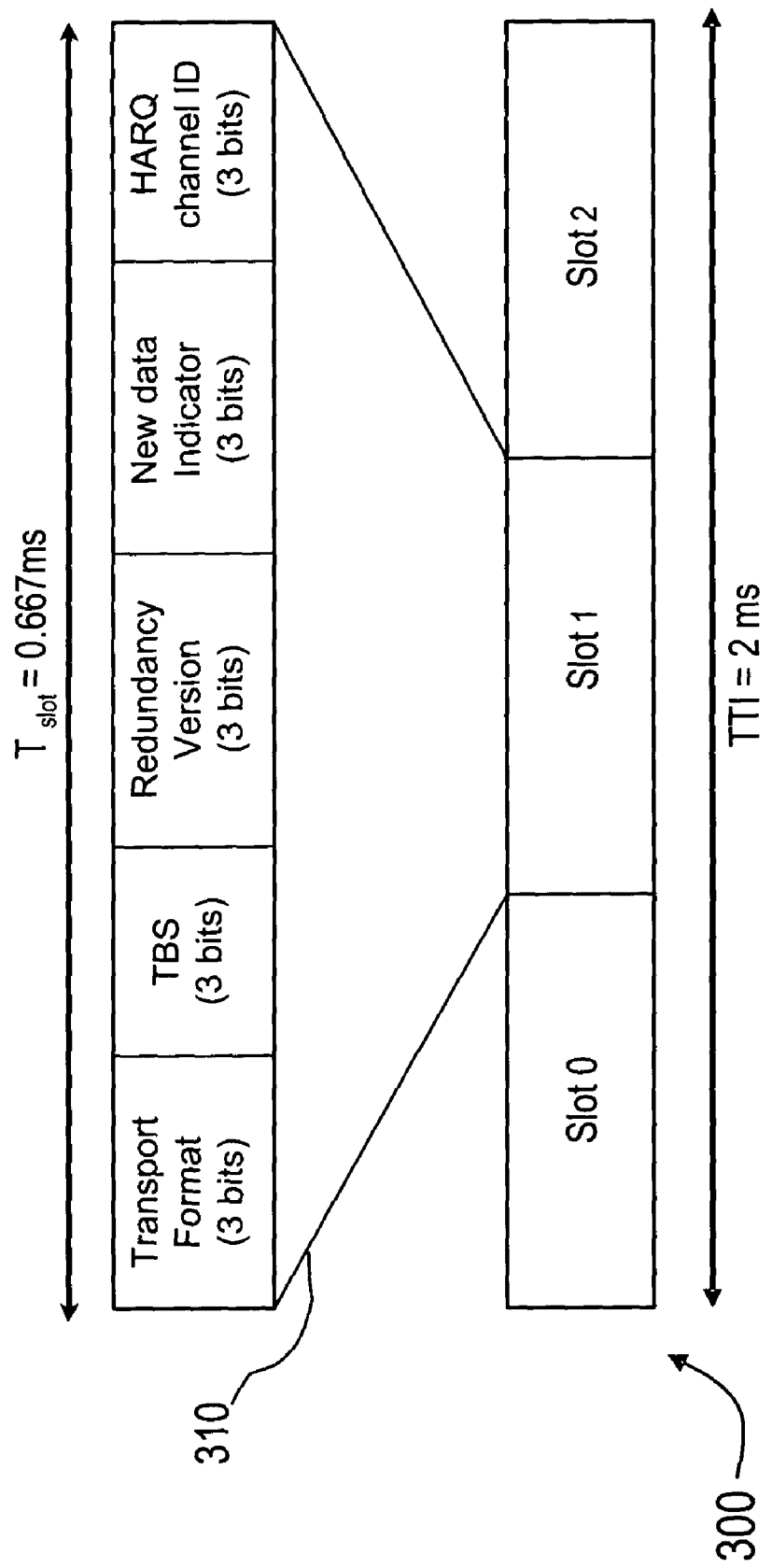
Figure 4C:
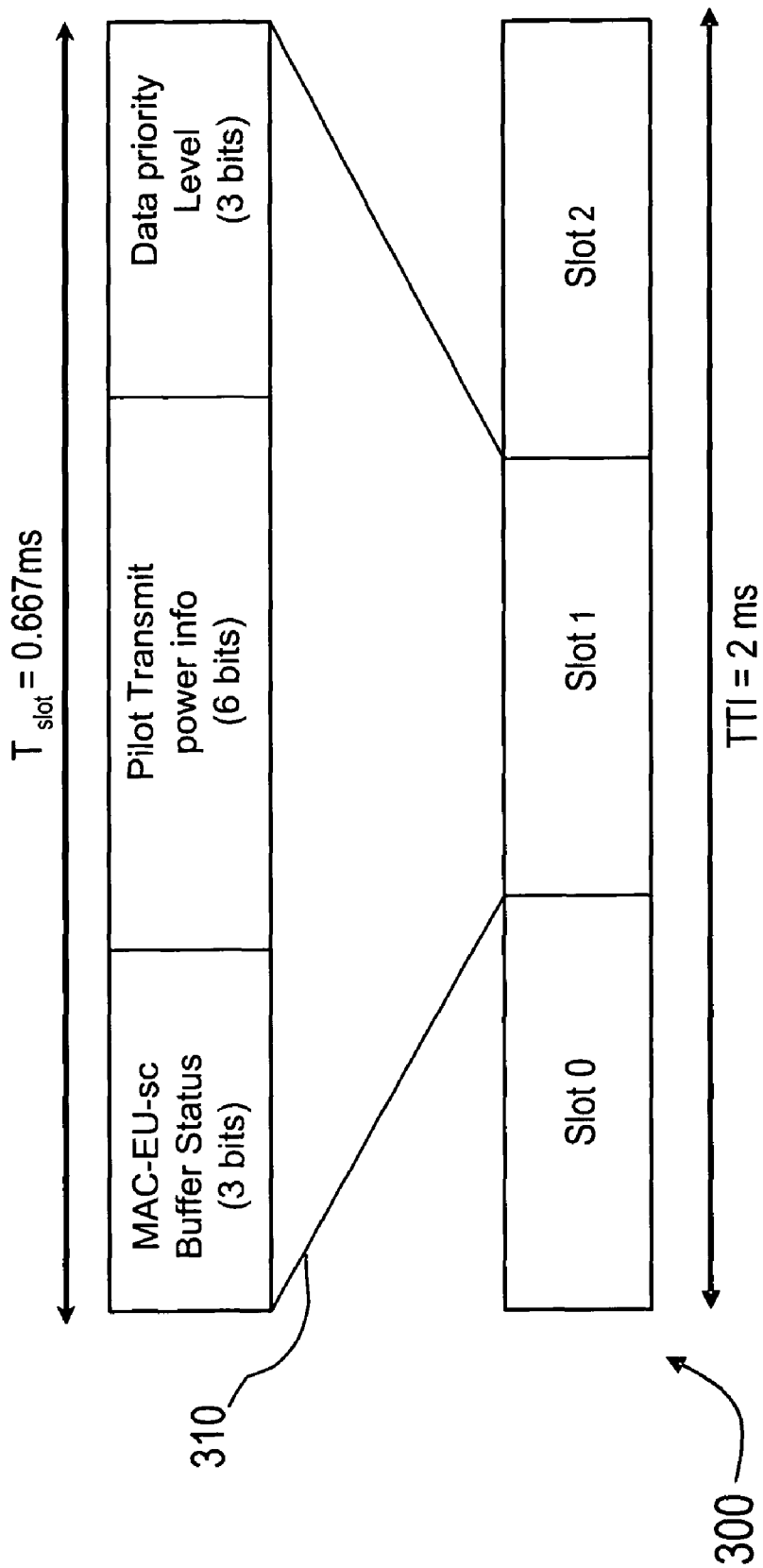

FIGS. 4A-4C illustrate exemplary structures of an EU-DPCCH sub-frame configured for a UE operating in different transmission modes in accordance with the exemplary embodiments of the invention. A primary function of the EU-DPCCH is to signal control information in the uplink to the Node B 110, regardless what transmission mode the UE 105 is in for scheduling of uplink transmissions. Accordingly, the slots 310 of the EU-DPCCH sub-frame 300 may have different field formats. Referring to FIG. 4A, for the scheduled mode, fields within a slot 310 may include a MAC-EU-sc buffer status field (3 bits), a Transport format field (3 bits), a Transport block size (TBS) field (3 bits) and a Redundancy version field (3 bits). The UE 105 maintains medium access control (MAC) buffers for the MAC layer for both the scheduled mode (MAC-EU-sc) and rate-controlled modes (MAC-EU-rc). These buffers contain the information bits coming from applications at the UE 105 that are waiting to be transmitted. The transport format field specifies the transport format of the packet transmitted from the UE 105. The transport format implies the modulation and channelization code that are used for the packet that is being transmitted on the associated data channel, or "EU-DPDCH". The Redundancy version is the version of the redundancy information for the re-transmitted packet. When first transmitting a packet, the UE 105 first creates several packets of the same information, each has different set of redundancy bits for the same information. Each such packet is given a version number and may be used during the re-transmission process to identify which version is being transmitted to the receiver.

Referring to FIG. 4B, for the scheduled mode, fields within a slot 310 of the EU-DPCCH sub-frame 300 may include the aforementioned Transport format field (3 bits), TBS field (3 bits) and Redundancy version field (3 bits), as well as a New data indicator field (1 bit) and a HARQ channel ID field (2 bits). The 'New data indicator' is a flag to indicate whether the data packet on the associated data channel (EU-DPDCH) is coming from a new transmission, or a re-transmission. A HARQ channel ID is used to identify, when there are multiple HARQ processes in progress from a given UE 105, which HARQ process the packet on the associated data channel is from.

Referring to FIG. 4C, when the EU-DPCCH is not associated with any EU-DPDCH, such as a case where the UE 105 is not scheduled by the Node B 110 or is not transmitting autonomously, the EU-DPCCH may be used to report certain control information for scheduling. This may be referred to as a reporting mode. In the reporting mode, the EU-DPCCH includes the MAC-UE-sc buffer status field (3 bits), a pilot transmit power information (6 bits) and a Data Priority level (3 bits). The data priority level field in the reporting mode is to signal the Node B the priority of the packet in the MCS-EU-sc buffer. Table 1 summarizes the above formats for the physical channel structures of the EU-DPCCH, for a UE 105 operating in different modes.

TABLE 1

Field Formats for Modes—EU-DPCCH

| Scheduled Mode | | Rate-Controlled Mode | | Reporting Mode | |
|---|---|---|---|---|---|
| Field | # of Bits | Field | # of Bits | Field | # of Bits |
| MAC-EU-sc buffer status | 3 | Transport format | 3 | MAC-EU-sc buffer status | 3 |
| Transport format | 3 | TBS | 3 | Pilot transmit power information | 6 |
| TBS | 3 | Redundancy version | 3 | Data Priority Level | 3 |
| Redundancy version | 3 | New data indicator | 1 | | |
| | | HARQ Channel ID | 2 | | |

Each format contains 12 bits. When operates in the extreme rate-controlled mode, the Transport format and TBS field in the EU-DPCCH rate-controlled mode is no longer needed. Multiple HARQ channels can be supported in both the scheduled and rate-controlled modes. The MAC-EU-sc buffer status and pilot transmit power information is needed periodically at the Node B 110 to perform the scheduling of the UE 105 for uplink transmission of packet data and/or high speed data. A UE 105 in scheduled mode reports this control information periodically using the EU-DPCCH.

Table 1 also illustrates the physical channel format in EU-DPCCH for reporting UE specific information. The reporting mode is used by the UE 105 for reporting UE-specific information; e.g., the UE 105 periodically reports the buffer status as well as pilot power information to the Node B 110 for scheduling purposes. As described above, the UE 105's MAC-EU buffer status is also reported when EU-DPCCH is in the scheduling mode. Note that the buffer status being reported is only the MAC-EU-sc buffer status. The MAC-EU-rc buffer is transparent to the Node B 110 and is not reported. This is because, in rate-controlled mode, the Node B 110 adjusts what is known as a transport format limit indicator (TFLI), which is an upper rate bound on a specified data rate for the UE 105 for a given service, based only on the interference caused by the UE 105, not how much data there are in the UE's buffer. The reporting cycle may be determined by the RNC 115 and can be changed by Radio Resource Controller (RRC) signaling, somewhat similar to the CQI reporting cycle on the uplink for HSPDA.

Since a limited number of bits are used to represent the size of the MAC-EU-sc buffer of the UE 105 at a given time instant, the size of the buffer is quantized to reduce field size. Accordingly, bit mapping of buffer size to a 3-bit buffer status may be performed in accordance with the exemplary mapping of Table 2. Referring to Table 2, for a MAC-EU-sc buffer size of 200, the buffer status is represented by the 3-bit string '000', for example.

TABLE 2

Mapping of the MAC-EU-sc buffer

| Buffer Status | Buffer Size range (Bits) |
|---|---|
| 000 | (0, 240) |
| 001 | (120, 240) |
| 010 | (240, 480) |
| 011 | (480, 960) |
| 100 | (960, 1920) |
| 101 | (1920, 3840) |
| 110 | (3840, 7680) |
| 111 | (7680, 15360) |

For the pilot transmit power information field, the transmit power is quantized to 6 bits. Since the maximum UE transmit power is typically restricted to 21 dBm, and the minimum transmit power is typically restricted to −44 dBm, the quantization of the pilot power should be mapped to this range with the traffic-to-pilot ratio taken into account. Table 3 provides an exemplary mapping for pilot transmit power.

TABLE 3

Pilot Report Update Quantization Levels

| Pilot Update | Node B Interpretation of Pilot Power (dBm) | UE Pilot Power Range (dBm) |
|---|---|---|
| 000000 | 16 | Above 15.5 |
| 000001 | 15 | 14.5 to 15.5 |
| 000010 | 14 | 13.5 to 14.5 |
| 000011 | 13 | 12.5 to 13.5 |
| 000100 | 12 | 11.5 to 12.5 |
| 000101 | 11 | 10.5 to 11.5 |
| 000110 | 10 | 9.5 to 10.5 |
| 000111 | 9 | 8.5 to 9.5 |
| 001000 | 8 | 7.5 to 8.5 |
| 001001 | 7 | 6.5 to 7.5 |
| 001010 | 6 | 5.5 to 6.5 |
| 001011 | 5 | 4.5 to 5.5 |
| 001100 | 4 | 3.5 to 4.5 |
| 001101 | 3 | 2.5 to 3.5 |
| 001110 | 2 | 1.5 to 2.5 |
| 001111 | 1 | 0.5 to 1.5 |
| 010000 | 0 | −0.5 to 0.5 |
| 010001 | −1 | −1.5 to −0.5 |
| 010010 | −2 | −2.5 to −1.5 |
| 010011 | −3 | −3.5 to −2.5 |
| 010100 | −4 | −4.5 to −3.5 |
| 010101 | −5 | −5.5 to −4.5 |
| 010110 | −6 | −6.5 to −5.5 |
| 010111 | −7 | −7.5 to −6.5 |
| 011000 | −8 | −8.5 to −7.5 |
| 011001 | −9 | −9.5 to −8.5 |
| 011010 | −10 | −10.5 to −9.5 |
| 011011 | −11 | −11.5 to −10.5 |
| 011100 | −12 | −12.5 to −11.5 |
| 011101 | −13 | −13.5 to −12.5 |
| 011110 | −14 | −14.5 to −13.5 |
| 011111 | −15 | −15.5 to −14.5 |
| 100000 | −16 | −16.5 to −15.5 |
| 100001 | −17 | −17.5 to −16.5 |
| 100010 | −18 | −18.5 to −17.5 |
| 100011 | −19 | −19.5 to −18.5 |
| 100100 | −20 | −20.5 to −19.5 |
| 100101 | −21 | −21.5 to −20.5 |

In accordance with the exemplary embodiments, the EU-DPCCH is designed so as to be the only uplink control channel necessary for a UE 105 to transmit signal control data in the uplink, e.g., to carry control information for the scheduled mode, rate-controlled mode or to report status to the Node B for scheduling (reporting mode).

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. A method of transmitting control signals in a communication network, comprising:
transmitting only control signal data related to scheduling for uplink transmission of packet data over a single control channel, the single control channel having physical structure and data arrangement therein corresponding to the control signal data transmitted on the single control channel, the physical structure of the control channel and the data arrangement in the control channel being selected based on a user transmission mode, the transmitting of the control signal data includes one of,
transmitting one or more of medium access control buffer status data, transport format data, transport block size data and redundancy data, if the transmission mode is a scheduled transmission mode,
transmitting one or more of, transport format data, transport block size data, HARQ channel ID data and an indicator indicating whether data carried on a corresponding data channel is a new packet or a re-transmission of a previous packet, if the transmission mode is a rate-controlled transmission mode, and
transmitting one or more of medium access control (MAC) buffer status data, pilot transmit power data and data related to priority of a packet in the MAC buffer, if a user is configured in a reporting mode.

2. The method of claim 1, wherein the control channel carries different control signal data based on the transmission mode.

3. The method of claim 1, wherein the scheduling mode specifies what users transmit on the uplink, start times for the user and duration of uplink transmission.

4. The method of claim 1, wherein the rate-controlled mode specifies an allowed data rate for a user, the user transmitting autonomously, subject to the allowed date rate.

5. The method of claim 1, wherein the user transmits the control channel in the reporting mode when the user is neither scheduled for uplink transmission nor transmitting autonomously while subject to an allowed data rate for uplink transmission.

6. A single control channel for signaling control information related to scheduling a user for uplink transmission of packet data in a communication network, comprising:
at least one sub-frame adapted to carry only control information, the control information being based on the transmission mode the user is in for scheduling an uplink transmission from the user to the network, the control information being transmitted over the single control channel, a physical structure of the sub-frame and a data arrangement in the sub-frame being selected based on a user transmission mode, the sub-frame includes a plurality of slots, each slot containing a plurality of fields of control information that differs based on the transmission mode of the user and one of,
one or more of medium access control buffer status field, a transport format field, a transport block size field and a redundancy version field, if the user is configured in a scheduled transmission mode,
one or more of a transport format field, a transport block size field, a HARQ channel ID field and an indicator indicating whether data carried on a corresponding data channel is a new packet or a re-transmission of a previous packet, if the user is configured in a rate-controlled transmission mode, and
one or more of a medium access control (MAC) buffer status field, pilot transmit power field and a priority data field related to priority of a packet in the MAC buffer, if the user is configured in a reporting mode.

7. The control channel of claim 6, wherein the scheduling mode specifies what users transmit on the uplink, start times for the user and duration of uplink transmission.

8. The control channel of claim 6, wherein the rate-controlled mode specifies an allowed data rate for the user as the user transmits autonomously, subject to the allowed date rate.

9. The control channel of claim 6, wherein the user transmits the control channel in the reporting mode when the user is neither scheduled for uplink transmission, nor transmitting autonomously while subject to an allowed data rate for uplink transmission.

10. The control channel of claim 6, wherein the user is in a reporting mode if there is no companion data channel on the uplink, in a rate-controlled transmission mode if there is no associated downlink transmission grant message received from a base station, and in a scheduling transmission mode if there is an associated downlink transmission grant message received from the base station.

11. The control channel of claim 6, wherein the at least one sub-frame has a 2 ms transmission time interval (TH).

12. The control channel of claim 6, wherein the at least one sub-frame has a transmission time interval (TTI) adapted to be changed based on a desired control channel design, and wherein the number of fields within a given slot of the sub-frame remains constant for any given TTI.

13. A method of receiving control signals in a communication network, comprising:
receiving only control signal data related to scheduling for uplink transmission of packet data over a single control channel, the single control channel having physical structure and data arrangement therein corresponding to the control signal data transmitted on the single control channel, the physical structure of the control channel and the data arrangement in the control channel being selected based on a user transmission mode, the receiving of the control signal data includes one of,
receiving one or more of medium access control buffer status data, transport format data, transport block size data and redundancy data, if the transmission mode is a scheduled transmission mode,
receiving one or more of, transport format data, transport block size data, HARQ channel ID data and an indicator indicating whether data carried on a corresponding data channel is a new packet or a re-transmission of a previous packet, if the transmission mode is a rate-controlled transmission mode, and
receiving one or more of medium access control (MAC) buffer status data, pilot transmit power data and data related to priority of a packet in the MAC buffer, if a user is configured in a reporting mode.

14. The control channel of claim 6, wherein,
the single control channel is a dedicated control channel,
the at least one sub-frame includes at least one time slot, and
the physical structure for each transmission mode includes a number of bits, the number of bits being the same for each transmission mode.

* * * * *